US010656873B2

(12) United States Patent
Carroll et al.

(10) Patent No.: US 10,656,873 B2
(45) Date of Patent: May 19, 2020

(54) TECHNOLOGIES FOR PRIORITIZING EXECUTION OF STORAGE COMMANDS

(71) Applicant: Intel Corporation, Santa Clara, CA (US)

(72) Inventors: John W. Carroll, Gilbert, AZ (US); David Cohen, Hull, MA (US); James R. Harris, Chandler, AZ (US); Eric Dahlen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/387,097

(22) Filed: Dec. 21, 2016

(65) Prior Publication Data

US 2018/0173461 A1  Jun. 21, 2018

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0673* (2013.01)

(58) Field of Classification Search
CPC .... G06F 3/0659; G06F 3/0656; G06F 3/0673; G06F 3/0611

USPC ......................................................... 711/158
See application file for complete search history.

(56) References Cited

U.S. PATENT DOCUMENTS

| 9,703,716 B2 * | 7/2017 | Segev ................. G06F 12/0862 |
| 2016/0371025 A1 * | 12/2016 | Park ...................... G06F 3/0659 |
| 2017/0017588 A1 * | 1/2017 | Frid ........................ G06F 13/18 |
| 2017/0147244 A1 * | 5/2017 | Matsumura ........... G06F 3/0622 |

* cited by examiner

*Primary Examiner* — Hua J Song
(74) *Attorney, Agent, or Firm* — Barnes & Thornburg LLP (57) ABSTRACT

Technologies for prioritized execution of storage commands by a data storage device include determining a priority of storage commands issued by a host and adding the storage commands to a queue of the data storage device based on the determined priority of the storage command. For example, the storage command issued by the host may be divided into sub-commands and added to a storage sub-command queue of the data storage device based on the determined priority of the storage command. The priority of the storage commands may be determined based on any suitable criteria including, for example, the host storage command queue storing the storage command, metadata associated with the storage command, the type or size of the storage command, and/or other aspects of the storage command, the host, and/or the data storage device.

22 Claims, 7 Drawing Sheets

TECHNOLOGIES FOR PRIORITIZING EXECUTION OF STORAGE COMMANDS

BACKGROUND

Typical data storage devices designed to be compatible with Non-Volatile Memory Eexpress (NVMe) (this specification is available at http://www.nvmexpress.org) and peripheral component interconnect express (PCIe) (this standard is available at http://pcisig.com) standards communicate with a host compute device through a programmable memory interface that includes submission queues and completion queues, defined by the NVMe Workgroup. A processor of the host compute device allocates and assigns message signaled interrupts (e.g., MSI, MSI-X, etc.) and the submission and completion queues for the data storage devices. To pass requests to a data storage device, the processor writes the request to the submission queue according to a predefined format and "rings a doorbell" of the data storage device to notify the data storage device of the request. The ringing of the doorbell of the data storage device is typically accomplished by writing to a specialized memory register (e.g. a doorbell register) or other memory location of the data storage device. Upon completion of the request, the data storage device writes a completion status to the corresponding completion queue and writes to a message signaled interrupt assigned by the processor to notify the processor of the completion of the request.

In some cases, the host may prioritize particular submission queues for time-sensitive or important requests. In such cases, the host may prioritize requests by assigning those high priority requests to the priority queue or otherwise submitting those requests in a particular order to force the desired priority. However, in a typical data storage device, once the requests are fetched from the submission queues, the requests are executed in sequential order. As such, if the data storage device is presently executing a lengthy, previously submitted storage request, any new high priority requests must wait until the completion of the presently executed storage request. In some situations, such as in the case when the presently executed storage request is a large write request, the subsequent higher priority request may be delayed for a significant amount of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
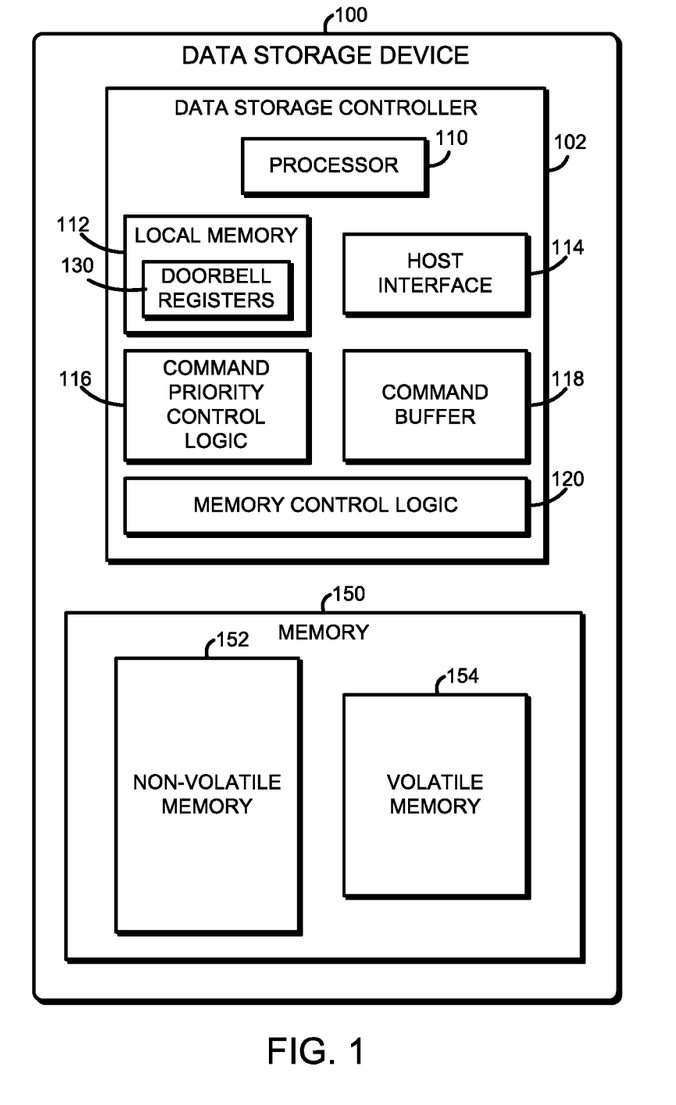
FIG. 1 is a simplified block diagram of at least one embodiment of a data storage device for prioritized execution of storage commands.

Referring now to FIG. 1, an illustrative data storage device 100 for prioritized execution of storage commands includes a data storage controller 102 and memory 150, which illustratively includes a non-volatile memory 152 and a volatile memory 154. As discussed in more detail below, during use, the data storage controller 102 of the data storage device 100 is configured to fetch new storage commands (e.g., read or write requests) from one or more storage command queues of a host, determine a priority of the newly fetched storage commands, and add the newly fetched storage commands to a data storage command queue maintained by the data storage controller 102 based on the determined priority of the newly fetched storage command. Specifically, because the data storage controller 102 is configured to segment large storage commands (e.g., a large write request) into multiple, smaller sub-commands, the data storage controller 102 may insert priority storage commands into the sub-command queue at an earlier temporal order of execution (e.g., as the next set of sub-commands to be executed). After the sub-commands of the priority storage command have been executed, the data storage controller 102 may return to the execution of the sub-commands of the previously fetched, but lower priority, storage command as discussed in more detail below. In this way, priority storage commands may be executed out-of-order from which they were fetched, unlike typical data storage devices.

The data storage device 100 may be embodied as any type of device capable of storing data in a volatile or non-volatile manner. In the illustrative embodiment, the data storage device 100 is embodied as a solid state drive, but may be embodied as other types of drives in other embodiments. Additionally, in the illustrative embodiment and as discussed in more detail below, the data storage device 100 is embodied as a non-volatile memory express (NVMe) (this standard is available at http://www.nvmexpress.org) data storage device, which is configured to communicate with a host over a peripheral component interconnect express (PCIe) (this standard is available at http://pcisig.com) bus. Of course, the data storage device 100 may be configured to utilize other types of communication specifications and/or standards to communicate with a host in other embodiments.

The data storage controller 102 of the data storage device 100 may be embodied as any type of control device, circuitry, or collection of hardware devices capable of controlling operation of the data storage device 100 and performing the functions described herein. In the illustrative embodiment, the data storage controller 102 includes a processor or processing circuitry 110, a local memory 112, a host interface 114, command priority control logic 116, a command buffer 118, and memory control logic (also referred to herein as a "memory controller") 120. In some embodiments, the memory control logic 120 may be located on the same die or integrated circuit as the processor 110 and/or the local memory 112. Alternatively, in some embodiments, the memory control logic 120 may be located on a separate die or integrated circuit than those of the processor 110 and/or the local memory 112. In some cases, the processor 110, the memory control logic 120, and the local memory 112 may be implemented in a single die or integrated circuit. Of course, the data storage controller 102 may include additional devices, circuits, and/or components commonly found in a drive controller of a solid state drive in other embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the local memory 112 may be embodied as any type of volatile and/or non-volatile memory or data storage capable of performing the functions described herein. In the illustrative embodiment, the local memory 112 stores firmware and/or other instructions executable by the processor 110 to perform the described functions of the data storage controller 102. Additionally, in the illustrative embodiment, the local memory 112 includes one or more doorbell registers or memory locations 130. As discussed in more detail below, in use, a host may notify the data storage device 100 of a new storage command request by writing to one or more doorbell registers 130. In response to the ringing of the doorbell (i.e., the writing to a doorbell register 130 by the host), the data storage device 100 retrieves the new storage command from one or more storage command queues of the host. In some embodiments, the processor 110 and the local memory 112 may form a portion of a System-on-a-Chip (SoC) and be incorporated, along with other components of the data storage controller 102, onto a single integrated circuit chip.

The host interface 114 may also be embodied as any type of hardware processor, processing circuitry, input/output circuitry, and/or collection of components capable of facilitating communication of the data storage device 100 with a host device or service (e.g., a host driver or application executed by the processor 202 of a compute device 200 as described below in regard to FIG. 2). That is, the host interface 114 embodies or establishes an interface for accessing data stored on the data storage device 100 (e.g., stored in the memory 150). To do so, the host interface 114 may be configured to utilize any suitable communication protocol and/or technology to facilitate communications with the data storage device 100 depending on the type of data storage device. In the illustrative embodiment, the host interface 114 is configured to communicate with a host device or service using a Non-Volatile Memory Express (NVMe) communication protocol (this specification is available at http://www.nvmexpress.org); however, in other embodiments, the host interface 114 may be configured to use additional or other communication protocols such as a Peripheral Component Interconnect Express (PCIe) protocol, NVMe over Fibre Channel, a Serial Advanced Technology Attachment (SATA) protocol, a Serial Attached SCSI (SAS) protocol, a Universal Serial Bus (USB) protocol, and/or other communication protocol and/or technology depending on the type of data storage device 100 and/or other criteria.

The command priority control logic 116 may be embodied as any device or circuitry capable of performing operations to determine a priority of new storage commands, divide or segment large storage commands into smaller storage sub-commands, and order the storage sub-commands into a sub-command queue based on the determined priority of the corresponding storage command. As discussed in more detail below, the command priority control logic 116 may determine the priority of a new storage command based on any suitable data, characteristic, or aspect of the storage command itself, the data storage device 100, and/or the host or service issuing the storage command. For example, the priority of a new storage command may be based on the host queue from which the storage command was retrieved, metadata or tags associated with the storage command, the type of the storage command (e.g., whether the storage command is a read or write request), the size of memory access of the storage command (e.g., whether the storage command is large write or read request), the state of execution of existing storage sub-commands, and/or other criteria. As discussed above, rather than being embodied as discrete components or circuitry, the command priority control logic 116 may be incorporated in, or otherwise form a portion of, the processor 110 in some embodiments.

The command buffer 118 of the data storage controller 102 is embodied as volatile memory used by the data storage controller 102 to temporarily store a sub-command queue of storage commands, as well as data that is being read from or written to the memory 150. The particular size of the buffer 118 may be dependent on the total storage size of the memory 150. The memory control logic 120 is illustratively embodied as hardware circuitry and/or device configured to control the read/write access to data at particular storage locations of the memory 150.

The non-volatile memory 152 of the memory 150 may be embodied as any type of data storage capable of storing data in a persistent manner (even if power is interrupted to the non-volatile memory 152). For example, in the illustrative embodiment, the non-volatile memory is embodied as Flash memory (e.g., NAND memory). However, in other embodiments, the non-volatile memory 152 may be embodied as any combination of memory devices that use chalcogenide phase change material (e.g., chalcogenide glass), three-dimensional crosspoint (3DXP) memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

The volatile memory 154 may be embodied as any storage medium that requires power to maintain the state of data stored by the medium. Examples of volatile memory may include various types of random access memory (RAM), such as dynamic random access memory (DRAM) or static random access memory (SRAM). One particular type of DRAM that may be used is synchronous dynamic random access memory (SDRAM). In particular embodiments, the DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the data storage device 100 that implement such standards may be referred to as DDR-based interfaces. In the illustrative embodiment, the volatile memory 154 is of a smaller or different size relative to the non-volatile memory 152, but may be of a similar size or larger in other embodiments.

Figure 2:
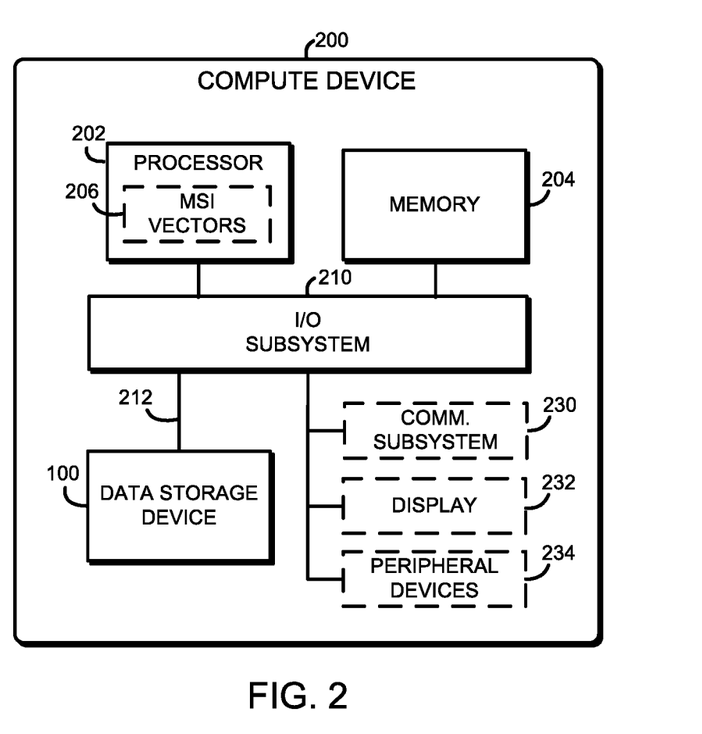
FIG. 2 is a simplified block diagram of at least one embodiment of a compute device including the data storage device of FIG. 1.

Referring now to FIG. 2, in some embodiments, the data storage device 100 may be incorporated in, or otherwise form a portion of, a compute device 200. The compute device 200 may be embodied as any type of compute device capable facilitating the prioritization of storage commands on the data storage device 100 and performing the functions described herein. For example, in some embodiments, the compute device 200 may be embodied as, without limitation, a computer, a server computer, a laptop computer, a notebook computer, a tablet computer, a smartphone, a consumer electronic device, a smart appliance, and/or any other compute device capable of facilitating the prioritization of storage commands on the data storage device 100.

In the illustrative embodiment, the compute device 200 is configured to communicate with the data storage device 100 using a non-volatile memory express (NVMe) communication protocol. As such, the illustrative compute device 200 includes a processor 202, which includes one or more message signaled interrupt (MSI) or message signaled interrupt extended (MSI-X) vectors 206, a main memory 204, an input/output subsystem 210, and the data storage device 100, which is coupled to other components of the compute device 200 via a peripheral component interconnect express (PCIe) bus 212. Of course, the compute device 200 may include other or additional components, such as those commonly found in a computer (e.g., communication subsystem, display, peripheral devices, etc.), in other embodiments. Additionally, in some embodiments, one or more of the illustrative components may be incorporated in, or otherwise from a portion of, another component. For example, the memory 204, or portions thereof, may be incorporated in the processor 202 in some embodiments.

In operation, the compute device 200 may allocate message signaled interrupts (MSI/MSI-X) vectors 206 of the processor 202 for the data storage device 100, and allocate submission queues and completion queues in the memory 204 for storing requests and completion status information of those requests. The compute device 200 may allocate or define any number of submission and corresponding completion queues in the memory 208. For example, in some embodiments, each processor core of the processor 202 may have a corresponding submission and completion queue, each application executed on the processor 202 may have a corresponding submission and completion queue, etc. Additionally, the compute device 200 may allocate or define one or more priority submission and completion queues for high priority tasks and requests, such as control or management requests. As such, the particular number of queues established in the memory 208 at any point in time may depend on the type of the compute device 200, the particular applications executed by the processor 202, and/or other criteria.

The processor 202 may be embodied as any type of processing device capable of performing the functions described herein. For example, the processor 202 may be embodied as a single or multi-core processor(s) having one or more processor cores, a microcontroller, or other processor or processing/controlling circuit. As discussed above, the processor 202 includes one or more MSI/MSI-X vectors 206, which may be embodied as internal memory registers or locations. In use, the data storage device 100 may write to the MSI/MSI-X vectors 206 to notify the processor 202 (e.g., via the generation of a corresponding interrupt) of the completion of a storage command submitted to one of the storage command submission queues of the host compute device 200.

The main memory 204 may be embodied as any type of volatile or non-volatile memory or data storage capable of performing the functions described herein. In operation, the main memory 204 may store various data and software used during operation of the compute device 200 such as storage device identifier data, request submission queue data, operating systems, applications, programs, libraries, and drivers. The main memory 204 is communicatively coupled to the processor 202 via the I/O subsystem 210. Of course, in other embodiments (e.g., those in which the processor 202 includes a memory controller), the main memory 204 may be directly communicatively coupled to the processor 202.

The I/O subsystem 210 may be embodied as circuitry and/or components to facilitate input/output operations with the processor 202, the memory 204, and other components of the compute device 200. For example, the I/O subsystem 210 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 210 may form a portion of a system-on-a-chip (SoC) and be incorporated, along with the processor 202, the memory 204, and other components of the compute device 200, on a single integrated circuit chip.

The compute device 200 may also include a communication subsystem 230, which may be embodied as one or more devices and/or circuitry capable of enabling communications with one or more other compute devices. The communication subsystem 230 may be configured to use any suitable communication protocol to communicate with other compute devices including, for example, wireless data communication protocols, cellular communication protocols, and/or wired communication protocols.

Additionally or alternatively, the compute device 200 may include a display 232 in some embodiments. The display 232 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 232 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. Additionally or alternatively, the compute device 200 may include one or more peripheral devices 234. Such peripheral devices 234 may include any type of peripheral device commonly found in a compute device such as speakers, a mouse, a keyboard, and/or other input/output devices, interface devices, and/or other peripheral devices.

Although the data storage device 100 has been described in the illustrative embodiment of FIG. 2 as a component of the compute device 200, it should be appreciated the data storage device 100 may form a component of other devices or systems in other embodiments. For example, in some embodiments, the data storage device 100 may form a storage component of a networked storage system and be communicated with over a corresponding network.

Figure 3:
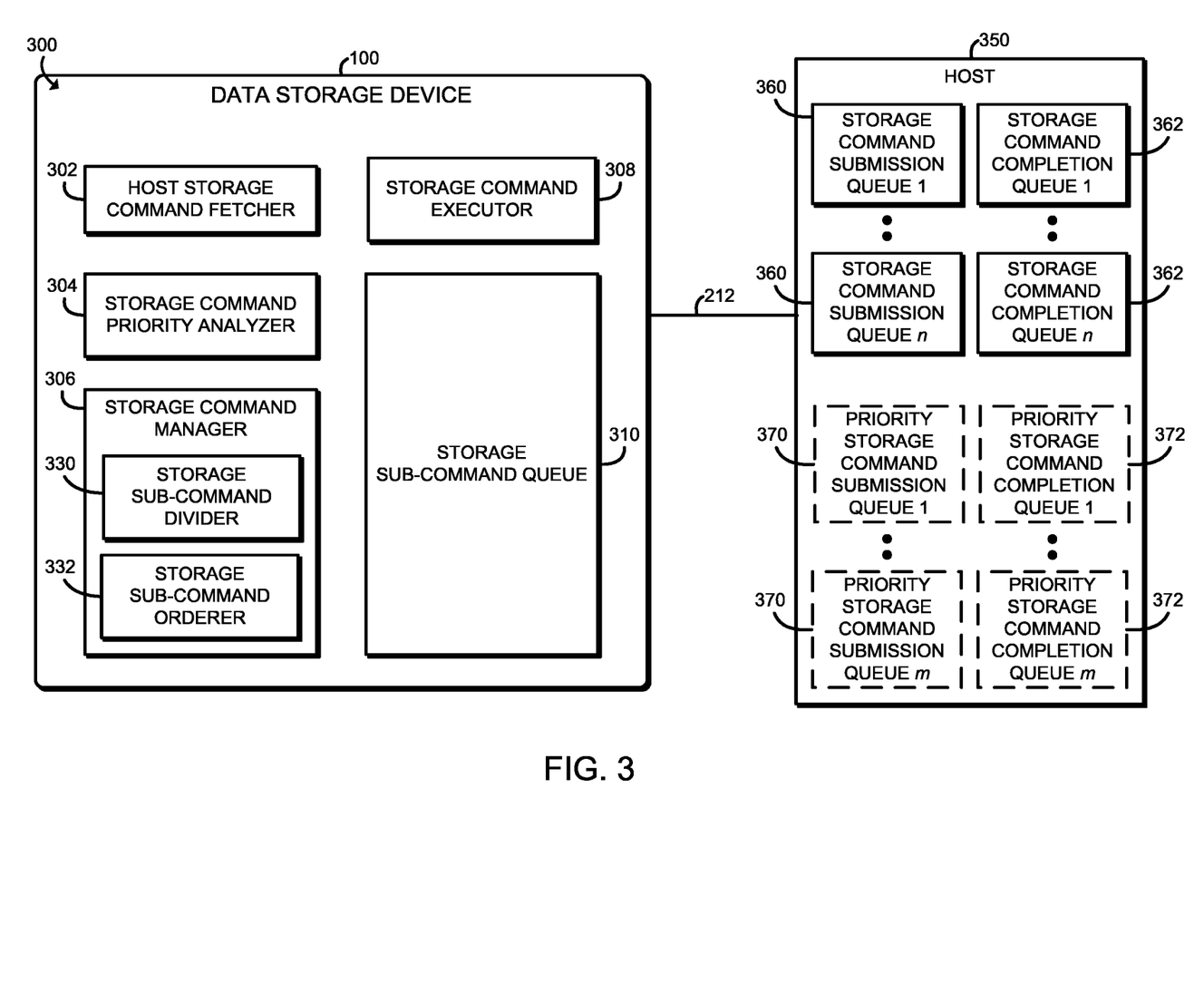
FIG. 3 is a simplified block diagram of at least one embodiment of an environment that may be established by the data storage device of FIG. 1

Referring now to FIG. 3, in use, the data storage controller 102 may establish an environment 300. The illustrative environment 300 includes a host storage command fetcher 302, a storage command priority analyzer 304, a storage command manager 306, and a storage command executor 308. Each of the components of the environment 300 may be embodied as firmware, software, hardware, or a combination thereof. For example the various components and logic of the environment 300 may form a portion of, or otherwise be established by, the data storage controller 102 (e.g., by the processor 110, the local memory 112, the command priority control logic 116, and/or the host interface 114) As such, in some embodiments, any one or more of the components of the environment 300 may be embodied as a circuit or collection of electrical devices (e.g., a host storage command fetcher circuit 302, a storage command priority analyzer circuit 304, a storage command manager circuit 306, a storage command executor circuit 308, etc.). The illustrative environment 300 also includes a storage sub-command queue 310, which stores the various sub-commands to be executed by the data storage device 100 as discussed in more detail below. The storage sub-command queue 310 may be embodied as any type of memory or data storage locations. For example, in the illustrative embodiment, the storage sub-command queue 310 forms a portion of the command buffer 118 of the data storage controller 102. Of course, in other embodiments, the environment 300 may include additional or other modules, logic, and/or components.

The host storage command fetcher 302, which may be embodied as hardware, firmware, software, virtualized hardware, emulated architecture, and/or a combination thereof as discussed above, is configured to fetch new storage commands submitted by a host 350. The host 350 may be embodied as any type of compute device, component, or service capable of issuing storage commands. For example, in the illustrative embodiment, the host 350 is embodied as the compute device 200 (e.g., the processor 202 and associated applications of the compute device 200). Additionally, the data storage device 100 and the host 350 communicate with each other over the bus 212, which may be embodied as a PCIe bus, a NVMe Fibre Channel, or other interconnect as discussed above. In the illustrative embodiment, the host 350 facilitates data storage with the data storage device 100 by establishing one or more storage command submission queues 360 and corresponding completion queues 362. The queues 360, 362 may be established in, for example, the memory 208. As discussed above, the host 350 may establish any number of submission and completion queues 360, 362. For example, the host 350 may establish a submission queue 360 and a corresponding completion queue 362 for each processor core of the processor 202, each application executed on the processor 202, and so forth. Additionally, in some embodiments, the host 350 may establish one or more priority storage command submission queues 370 and corresponding priority storage command completion queues 372. Such priority queues 370, 372 may be established to hold storage commands that the host 350 considers to be priority commands, such as control or management commands.

To issue a storage command, the host 350 stores or allocates the particular storage command to the appropriate submission queue 360, 370. The storage command may be embodied as any type of memory access command such as a memory read access command or a memory write access command. The host 350 subsequently "rings a doorbell" of the data storage device 100. To do so, the host 350 may write to one or more doorbell registers 130 of the local memory 112 of the data storage device 100 (see FIG. 1). In response to the ringing of the doorbell, the host storage command fetcher 302 fetches the new storage command from the corresponding submission queue 360, 370 as indicated by the corresponding doorbell (e.g., based on which doorbell register was written to). In this way, the host 350 may issue storage commands to the data storage device 100. Of course, it should be appreciated the host 350 may utilize other methodologies or mechanisms to issue storage commands to the data storage device 100 in other embodiments.

The storage command priority analyzer 304, which may be embodied as hardware, firmware, software, virtualized hardware, emulated architecture, and/or a combination thereof as discussed above, is configured to analyze newly fetched storage commands to determine a priority of those storage commands. To do so, the storage command priority analyzer 304 may utilize any criteria, aspect, or characteristic of the storage command itself, the data storage device 100, the host 350, and/or other criteria. For example, in some embodiments, the storage command priority analyzer 304 may determine the priority of a new storage command based on the storage command submission queue from which the storage command was fetched. For example, if the storage command was fetched from a priority storage command submission queue 370 of the host 350, the storage command priority analyzer 304 may determine that the storage command is of high priority. Additionally or alternatively, the storage command priority analyzer 304 may analyze metadata associated with the storage command. For example, in some embodiments, the host 350 may be configured to embed, or otherwise associate, a priority tag with the storage command to indicate to the data storage device 100 that the corresponding storage command is a priority storage command. Further, in some embodiments, the storage command priority analyzer 304 may analyze the storage command itself to determine its priority. For example, storage commands that can be performed quicker than other storage commands may be inferred to be of a higher temporal priority (e.g., a read storage command may be interpreted as having a high priority than a write storage command). Additionally, the memory access size of the storage command may dictate the priority of the command. For example, the storage command priority analyzer 304 may infer a higher priority for storage commands that have a lower memory access size relative to other storage commands (e.g., a small write command may be inferred to have a higher priority than a large write command). Further, in some embodiments, the storage command priority analyzer 304 may determine a priority of a newly fetched storage command based on an aspect of the host 350. For example, the storage command priority analyzer 304 may infer a priority of the new storage command based on an identity of the application that issued the storage command, based on an identity of a processor core or processor that issued the storage command, etc. It should be appreciated that the storage command priority analyzer 304 may determine the priority of storage commands in a binary format (e.g., priority commands and non-priority commands), in a range format (e.g., low, mid, and high priority), or as a relative priority. For example, in some embodiments, the storage command priority analyzer 304 may infer the priority of a new storage command by comparing the storage command to storage commands presently stored in the storage sub-command queue 310.

The storage command manager 306, which may be embodied as hardware, firmware, software, virtualized hardware, emulated architecture, and/or a combination thereof as discussed above, is configured to add newly fetched storage commands to the storage sub-command queue based on the priority of the storage command as determined by the storage command priority analyzer 304. To do so, the storage command manager 306 includes a storage sub-command divider 330 and a storage sub-command orderer. The storage sub-command divider 330 is configured to divide large storage commands into smaller sub-commands. For example, storage commands that have a large access size (e.g., a write command to write to a large section of memory 150) may be divided or segmented into smaller storage sub-commands. That is, large storage commands are divided into multiple storage sub-commands that, when executed in total, perform the task of the larger storage command. The individual size of the storage sub-commands may be dependent upon characteristics, features, or limitations of the data storage device 100 (e.g., the maximum direct memory access size). For example, in an illustrative embodiment, the storage sub-command divider 330 may divide a large 128 Kbyte write command into 32 4 Kbyte write sub-commands, which may be the maximum direct memory access size in some embodiments. In those cases wherein the newly fetched storage command is small enough, the storage sub-command divider 330 may not need to divide the storage command into multiple sub-commands.

The storage sub-command orderer 332 adds the storage sub-commands generated by the storage sub-command divider into the storage sub-command queue 310 based on the priority of the corresponding storage command as determined by the storage command priority analyzer 304. For example, if the storage command is determined to be of high priority, the storage sub-command orderer 332 may add the set of storage sub-commands corresponding to that storage command to a "top" of the storage sub-command queue 310 such that the set of storage sub-commands are executed next after the presently executing sub-command. In this way, a priority storage command may be executed by the data storage device 100 without waiting for an existing large storage command to complete execution (e.g., without waiting for all of the sub-commands of the large storage command to be executed). Of course, the storage sub-command orderer 332 may add the storage sub-commands to any location of the storage sub-command queue 310 in other embodiments. For example, the storage sub-command orderer 332 may add the new storage sub-commands to the storage sub-command queue 310 based on the relative priority of the new storage sub-commands and those storage sub-commands already in the storage sub-command queue 310. Of course, if the newly fetched storage command was determined not to be of any priority, the storage sub-command orderer 332 may simply add the corresponding storage sub-commands to the bottom of the sub-command queue 320 such that the new storage sub-commands are executed after each storage sub-commands presently stored in the sub-command queue 320.

The storage command executor 308 is configured to execute the storage sub-commands of the storage sub-command queue 310. To do so, the storage command executor 308 executes the storage sub-commands in sequential order as located in the storage sub-command queue 310. For example, in the illustrative embodiment, storage sub-commands located at the "top" of the storage sub-command queue 310 are executed prior to storage sub-commands located at the "bottom" of the storage sub-command queue 310.

Figure 4:
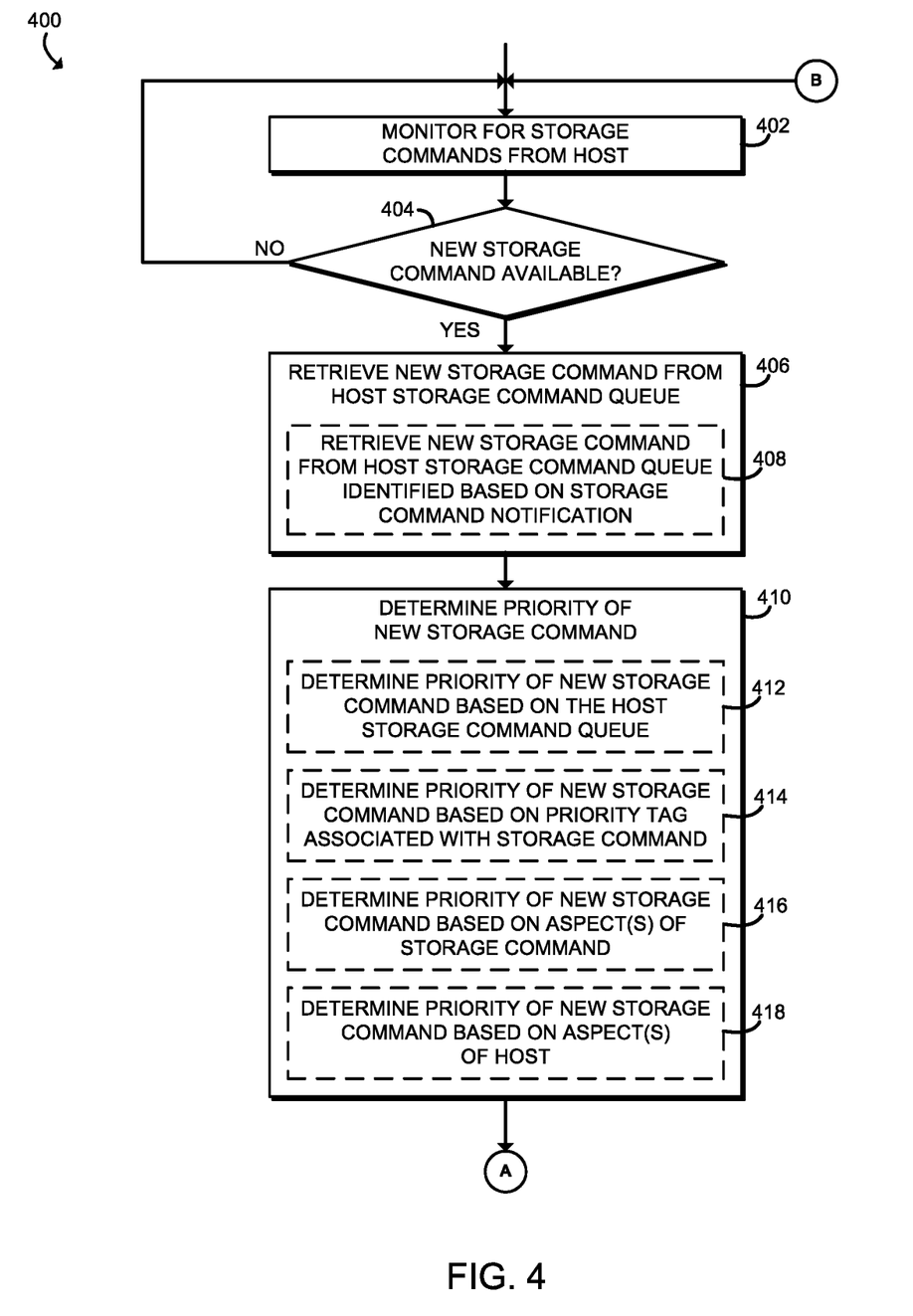
FIGS. 4 and 5 are a simplified flow diagram of at least one embodiment of a method for prioritizing the execution of storage commands that may be executed by the data storage device of FIGS. 1 and 3.

Referring now to FIG. 4, in use, the data storage controller 102 of the data storage device 100 may execute a method 400 for prioritizing the execution of storage commands. The method 400 begins with block 402 in which the data storage controller 102 monitors for storage commands from the host 350. To do so, in the illustrative embodiment, the data storage controller 102 may monitor for ringing of a doorbell by the host 350. That is, the data storage controller 102 may monitor the doorbell registers 130 to determine whether the host has written to one or more of the doorbell registers 130. As discussed below, the particular doorbell register 130 written to by the host 350 may identify the corresponding storage command submission queue 360, 370 to which the host 350 has stored a storage command request. In block 404, the data storage controller 102 determines whether a new storage command is available. If not, the method 400 loops back to block 402 in which the data storage controller 102 continues to monitor for new storage commands from the host 350.

If the data storage controller 102 determines that a storage command has been issued by the host 350 (e.g., based on the "ringing of a doorbell"), the method 400 advances to block 406. In block 406, the data storage controller 102 retrieves or fetches the new storage command from the corresponding submission queue 360, 370. To do so, in some embodiments in block 408, the data storage controller 102 may retrieve the new storage command from a submission queue identified based on the particular doorbell register 130 that was written to by the host 350 (i.e., based on which doorbell of the data storage device 100 was rung).

After the new storage command has been retrieved in block 406, the method 400 advances to block 410 in which the data storage controller 102 determines a priority of the new storage command. As discussed above, the data storage command may determine the priority based on any criteria, aspect, or characteristic of the data storage command itself, the host 350, and/or the data storage device 100. For example, in block 412, the data storage controller 102 may determine a priority of the new storage command based on the storage command submission queue 360, 370 from which the new storage command was retrieved. In the embodiment of FIG. 3, for example, the data storage controller 102 may determine a new storage command retrieved from the priority storage command submission queue 370 to be of a high priority. It should be appreciated that although the embodiment of FIG. 3 illustrates only a two-tier priority scheme, the host 350 may establish multi-tiered priority submission queues in other embodiments. As such, the priority of a new storage command may fall into binary priorities (e.g., priority or non-priority) or into a range of priorities (e.g., tier 1 priority, tier 2 priority, etc.)

Additionally or alternatively, the data storage controller 102 may determine the priority of a new storage command based on metadata associated with the storage command in block 414. For example, in some embodiments, the host 350 may be configured to append or otherwise associate a priority tag to the storage command when issued to a submission queue 360, 370. Again, the priority of the metadata may be binary in nature (e.g., whether a tag is present or not) or may identify a range of priorities (e.g., tier 1 priority, tier 2 priority, etc.).

In some embodiments, in block 416, the data storage controller 102 may additionally or alternatively determine the priority of a new storage command based on aspects of the storage command itself. For example, as discussed above, the data storage controller 102 may determine the priority of the new storage command based on the type of storage command (e.g., read or write), the size of a memory access of the storage command, and/or other criteria or characteristic of the storage command. In the illustrative embodiment, read storage commands are assigned a higher priority than write storage commands, and storage commands of a smaller memory access size are assigned a higher priority than storage commands of a larger memory access size. For example, a read storage command of a small access size may be assigned a higher priority than a write storage command of a medium access size. Of course, it should be appreciated that, in some embodiments, the priority of a newly retrieved storage command may be based on the priority of other storage commands presently in the storage sub-command queue 310. For example, a priority of a storage command based on its memory access size may be relative to the memory access size of storage commands presently in the storage sub-command queue.

Additionally or alternatively, in some embodiments, the data storage controller 102 may determine the priority of a new storage command based on aspects of the host 350. For example, similar to determining the priority based on the submission queue 360, 370 from which the new storage command was retrieved, the data storage controller 102 may determine a priority of a new submission command based on the processor or processor core issuing the storage command, based on the application issuing the storage command, and/or other criteria or aspects of the host 350.

Figure 5:
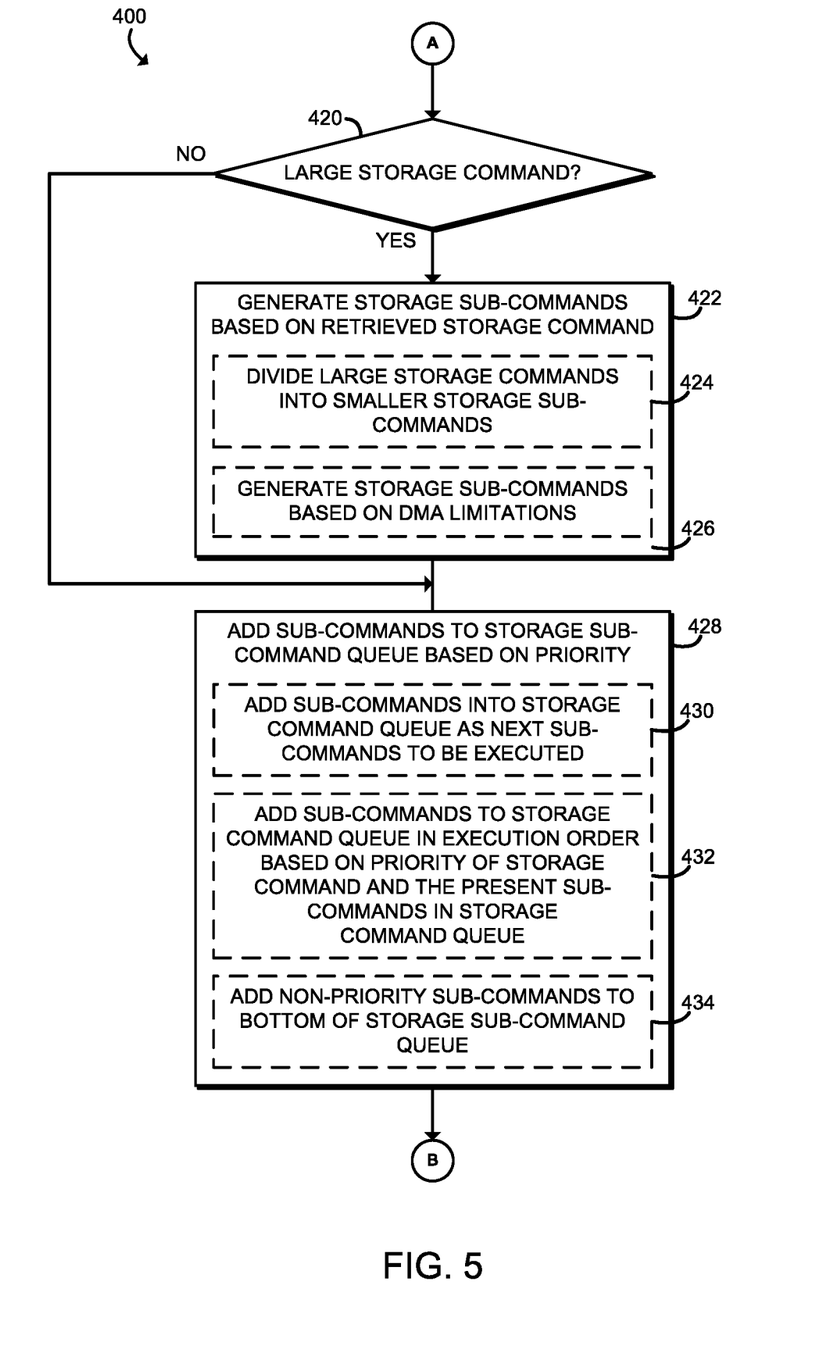

After the data storage controller 102 has determined the priority of the new storage command, the method 400 advances to block 420 of FIG. 5 in which the data storage controller 102 determines whether the new storage command is of a large size. To do so, the data storage controller 102 may analyze the size of the memory access requested by the new storage command. As discussed above, the memory access size of a storage command may be limited by particular aspects or characteristics of the data storage controller 102 and/or data storage device 100. For example, in the illustrative embodiment, the memory access size of each executed storage command is limited to the maximum direct memory access (DMA) size of the data storage controller 102. As such, in block 420, the data storage controller 102 determines if the new storage command has an access size greater than the reference threshold size. If not, the method 400 advances to block 428 discussed below. If, however, the data storage controller 102 determines that the new storage command is a large storage command, the method 400 advances to block 422.

In block 422, the data storage controller 102 generates one or more sub-commands based on the newly retrieved storage command. To do so, in block 424, the data storage controller 102 may divide or segment the retrieved storage command into multiple storage sub-commands. For example, a newly fetched storage command having a memory access size of 128 Kbytes may be divided into 32 storage sub-commands, each having a memory access size of 4 Kbytes. As discussed above, the particular size of the individual storage sub-commands may be based on the maximum direct memory access (DMA) size of the data storage controller 102. As such, in block 426, the data storage controller 102 may generate the storage sub-commands by dividing the retrieved storage command into multiple storage sub-commands based on the maximum DMA size of the data storage controller 102 (e.g., such that no storage sub-command has a memory access size greater than the maximum DMA size).

After the data storage controller 102 has generated the storage sub-commands in block 422 or if retrieved storage command is determined not to be a large storage command in block 420, the method 400 advances to block 428. In block 428, the data storage controller 102 adds the sub-commands to the storage sub-command queue 310. It should be appreciated that if the retrieved storage command is not a large storage command, the retrieved storage command may be added to the storage sub-command queue 310 as a single sub-command.

In the illustrative embodiment, the particular position at which the data storage controller 102 adds the storage sub-commands to the storage sub-command queue 310 depends on the priority of the new storage sub-commands. For example, in block 430, if the newly retrieved storage command was determined to be a priority storage command, the data storage controller 102 may add the corresponding storage sub-commands at the "top" of the storage sub-command queue 310 as the next set of sub-commands to be executed in block 430. It should be appreciated that in doing so, the new storage sub-commands may intersperse an existing set of sub-commands (see, e.g., FIG. 7).

Of course, in other embodiments, the particular position at which the data storage controller 102 adds the new storage sub-commands to the storage sub-command queue 310 may depend on both the priority of the new storage sub-commands and the priority of existing sub-commands in the storage sub-command queue 310. For example, in block 432, the data storage controller 102 may add the new set of storage sub-commands to the storage sub-command queue 310 at a location based on the determined priority of the new set of storage sub-commands and the priority of existing sub-commands. In such embodiments, the new set of storage sub-commands may be placed in a temporal position within the storage sub-command queue 310 such that existing storage sub-commands of a higher priority are executed prior to the new set of storage sub-commands, but existing storage sub-commands of a lower priority are executed subsequent to the execution of the new set of storage sub-commands.

If, of course, the data storage controller 102 determines that the storage command is not a priority storage command, the data storage controller 102 may add the corresponding storage sub-commands to the "bottom" of the storage sub-command queue 310 in block 434. In this way, the data storage controller 102 may order storage commands for execution based on a determined or inferred priority of each command. It should be appreciated that the ordering of storage commands performed by the data storage controller 102 may be performed with no knowledge of such ordering by the host 350 in some embodiments.

Figure 6:
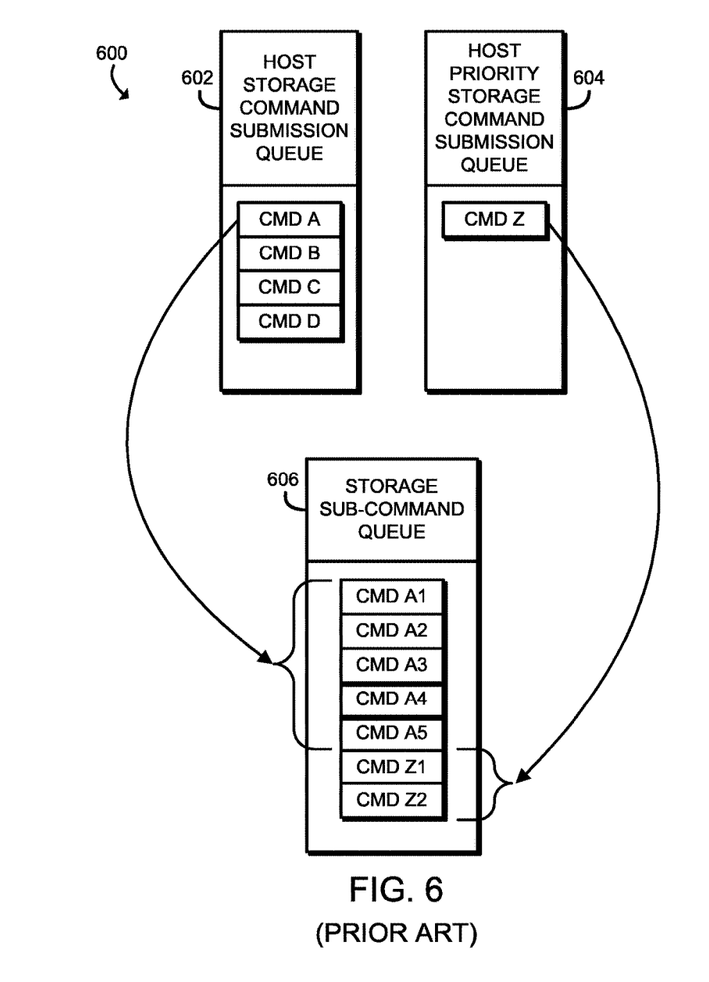
FIG. 6 is a simplified block diagram of a storage device sub-command queue of a typical data storage device.

Referring now to FIG. 6, an illustrative embodiment 600 of the queueing of sub-commands by a typical data storage device is shown. In the illustrative example, a host has issued four standard priority commands, CMD A, CMD B, CMD C, and CMD D, to a standard host storage command submission queue 602. The typical data storage device has retrieved the first standard storage command, CMD A, and divided that command into five storage sub-commands, CMD A1, CMD A2, CMD A3, CMD A4, and CMD A5, which have been added to a storage sub-command queue 606 of the typical data storage device. The host subsequently issues a high priority command, CMD Z, to a high priority storage command submission queue 604. In response, the typical data storage device retrieves the high priority command, CMD Z, divides the high priority command into multiple storage sub-commands, CMD Z1 and CMD Z2, and adds those storage sub-commands to the bottom of the storage sub-command queue 606. However, the high priority storage sub-commands, CMD Z1 and CMD Z2, will be executed only after execution of each of the lower priority storage sub-commands CMD A1, CMD A2, CMD A3, CMD A4, and CMD A5. As such, it should be appreciated that, in those embodiments in which the low priority storage command, CMD A1, is a large storage command, the execution of the high priority storage sub-commands, CMD Z1 and CMD Z2, may be delayed an unacceptable amount of time.

Figure 7:
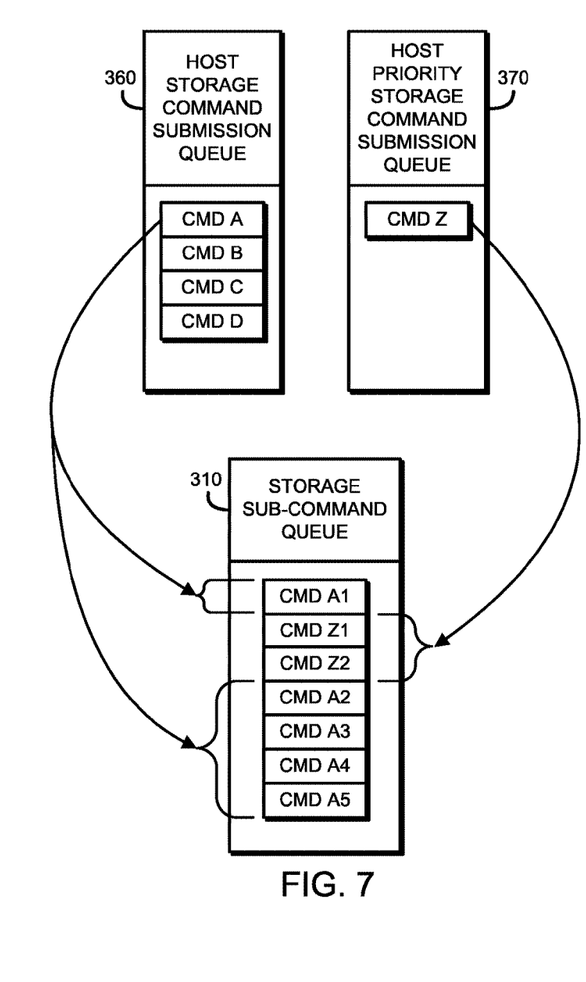
FIG. 7 is a simplified block diagram of a storage device sub-command queue of the data storage device of FIGS. 1 and 3 during execution of the method of FIGS. 4 and 5.

Conversely, as shown in FIG. 7, the data storage controller 102 of the illustrative data storage device 100 is configured to store new storage commands based on the priority of those new storage commands. As such, if the data storage controller 102 determines that the new storage command, CMD Z, is of high priority (e.g., based on the high priority submission queue 370 from which the storage command, CMD Z, was retrieved), the data storage controller 102 adds the corresponding storage sub-commands, CMD Z1 and CMD Z2, to the storage sub-command queue 310 based on the priority of those storage sub-commands, CMD Z1 and CMD Z2. For example, in the illustrative embodiment, the data storage controller 102 adds the storage sub-commands, CMD Z1 and CMD Z2, to the storage sub-command queue 310 as the next set of storage sub-commands to be executed after the presently executing storage sub-command, CMD A1. It should be appreciated that, as such, the storage command, CMD A1, will complete execution after the execution of the higher priority storage command, CMD Z.

Figure 8:
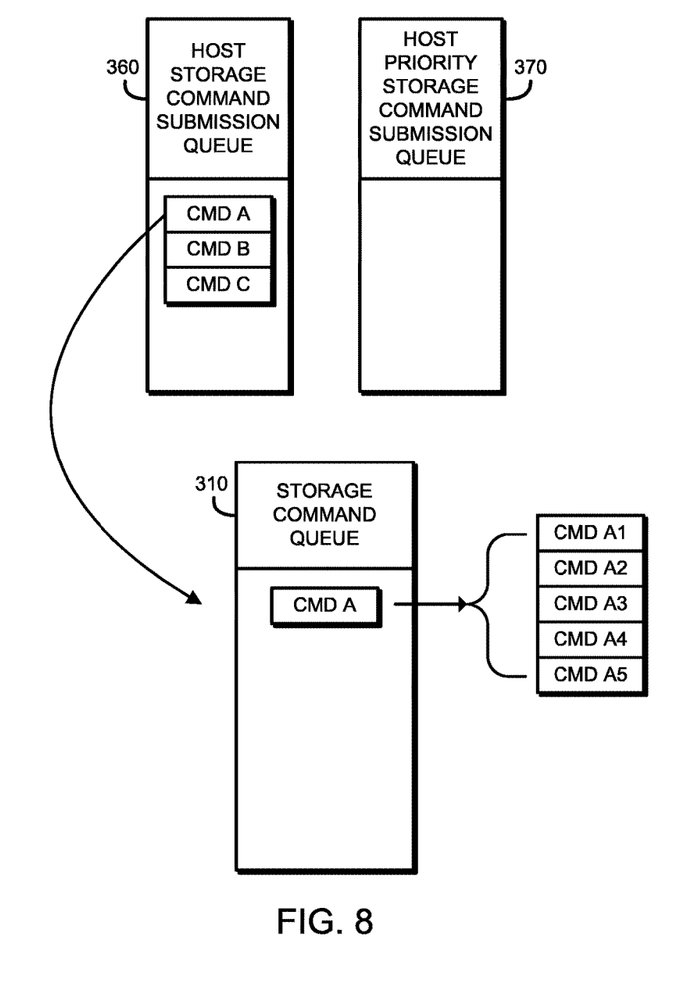
FIGS. 8 and 9 are simplified block diagram of another embodiment of a storage device command queue of the data storage device FIGS. 1 and 3 during execution of another embodiment of the method of FIGS. 4 and 5.
Figure 9:
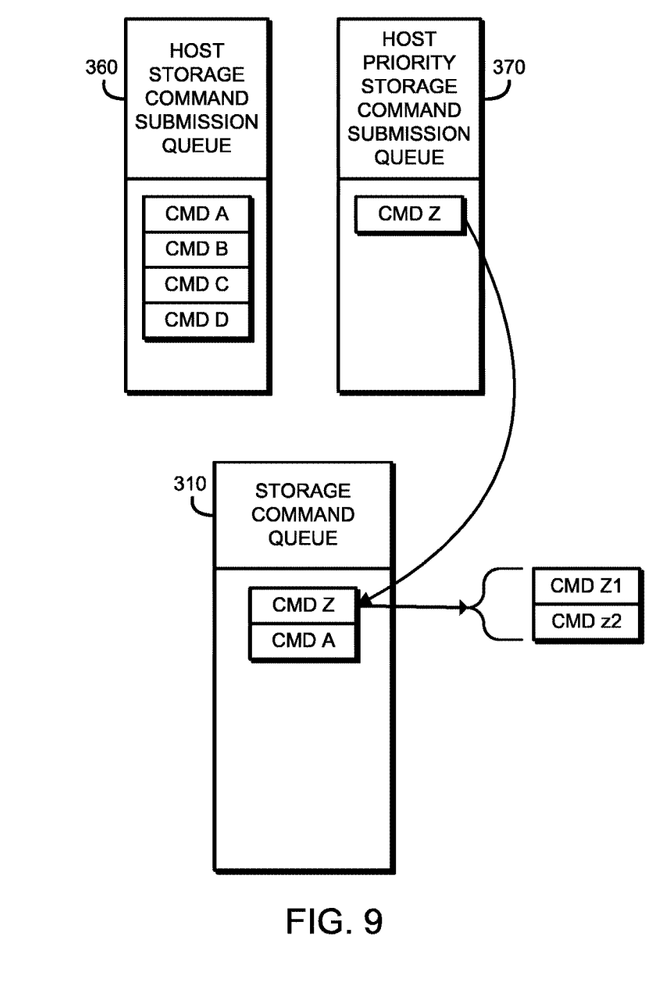

Referring now to FIGS. 8 and 9, in some embodiments, the data storage controller 102 may be configured to store storage commands received from the host directly into the storage queue 310 prior to dividing the storage command into corresponding, individual sub-commands. In such embodiments, the storage queue 310 may be embodied as a storage command queue 310, and the storage commands are stored in the storage command queue 310 based on the relative priority of the newly received storage commands. For example, as shown in the example of FIG. 8, a host has issued three standard priority commands, CMD A, CMD B, and CMD C, to the host storage command submission queue 360. The data storage controller 102 has retrieved the first storage command, CMD A, and stored the un-divided storage command in the storage command queue 310. Upon execution of the storage command CMD A, the data storage controller 102 divides that storage command, CMD A, into multiple storage sub-commands, CMD A1, CMD A2, CMD A3, CMD A4, and CMD A5, and begins execution of those sub-commands in sequential order. However, as shown in the example of FIG. 9, the host subsequently issues a high priority storage command, CMD Z. In response, the data storage controller 102 retrieves the high priority storage command, CMD Z, and stores that storage command in the storage command queue 310 based on the priority of the high priority storage command, CMD Z, and any other storage commands presently stored in the storage command queue 310. For example, because the storage command, CMD A, is of lower priority than the new, high priority storage command, CMD Z, the data storage controller 102 stores the high priority storage command, CMD Z, as the next storage command to be executed. The data storage controller 102 may then execute the high priority storage command, CMD Z, by dividing that command into multiple storage sub-commands, CMD Z1 and CMD Z2. After the high priority storage command, CMD Z, is executed, the data storage controller 102 may return to the execution of the lower priority storage command, CMD A. To do so, in some embodiments, the data storage controller 102 may execute the next unexecuted storage sub-command of the lower priority storage command, CMD A (e.g., CMD A2). Alternatively, in other embodiments, the data storage controller 102 may simply re-execute one or more previously executed storage sub-commands of the lower priority storage command, CMD A. For example, the data storage controller 102 may begin execution of the first storage sub-command, CMD A1, of the lower priority storage command CMD A.

Reference to memory devices above can apply to different memory types, and in particular, any memory that has a bank group architecture. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDRb5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device.

EXAMPLES

Illustrative examples of the technologies disclosed herein are provided below. An embodiment of the technologies may include any one or more, and any combination of, the examples described below.

Example 1 includes a data storage device for prioritized execution of storage commands, the data storage device comprising a memory to store a storage sub-command queue; and a host storage command fetcher to retrieve a storage command from a storage command queue of a host; a storage command priority analyzer to determine a priority of the retrieved storage command; a storage command manager to generate, based on the retrieved storage command, one or more storage sub-commands to execute the retrieved storage command and add the sub-commands to the storage sub-command queue based on the determined priority of the retrieved storage command.

Example 2 includes the subject matter of Example 1, and wherein to retrieve the storage command from the storage command queue of the host comprises to retrieve the storage command from the storage command queue of the host in response to the ringing of a doorbell of the data storage device by the host.

Example 3 includes the subject matter of any of Examples 1 and 2, and wherein to retrieve the storage command from the storage command queue of the host in response to the ringing of a doorbell of the data storage device by the host comprises to retrieve the storage command from the storage command queue of the host in response to the host writing to a doorbell register of the data storage device.

Example 4 includes the subject matter of any of Examples 1-3, and wherein to determine the priority of the retrieved storage command comprises to determine a priority of the retrieved storage command based on a priority associated with the storage command queue of the host from which the storage command was retrieved.

Example 5 includes the subject matter of any of Examples 1-4, and wherein to determine the priority of the retrieved storage command comprises to determine a priority of the retrieved storage command based on metadata associated with the retrieved storage command.

Example 6 includes the subject matter of any of Examples 1-5, and wherein to determine the priority of the retrieved storage command comprises to determine a priority of the retrieved storage command based on a priority tag associated with the retrieved storage command.

Example 7 includes the subject matter of any of Examples 1-6, and wherein to determine the priority of the retrieved storage command comprises to determine a priority of the retrieved storage command based on a size of a storage access of the retrieved storage command.

Example 8 includes the subject matter of any of Examples 1-7, and wherein to determine the priority of the retrieved storage command comprises to determine a priority of the retrieved storage command based on a type of the retrieved storage command.

Example 9 includes the subject matter of any of Examples 1-8, and wherein to determine the priority of the retrieved storage command based on the type of the retrieved storage command comprises to determine that the storage command is of a high priority in response to a determination that the retrieved storage command is a read command.

Example 10 includes the subject matter of any of Examples 1-9, and wherein to determine the priority of the retrieved storage command based on the type of the retrieved storage command comprises to determine that the storage command is of a high priority in response to a determination that the retrieved storage command is a write command with a storage access size less than a reference threshold.

Example 11 includes the subject matter of any of Examples 1-10, and wherein to determine the priority of the retrieved storage command comprises to determine a priority of the retrieved storage command based on an application of the host that issued the storage command.

Example 12 includes the subject matter of any of Examples 1-11, and wherein to determine the priority of the retrieved storage command comprises to determine a priority of the retrieved storage command based on a processor core of the host that issued the storage command.

Example 13 includes the subject matter of any of Examples 1-12, and wherein to generate the one or more storage sub-commands comprises to determine a size of a storage access of the retrieved storage command; and generate one or more storage sub-commands based on the retrieved storage command in response to a determination that the size of the storage access is greater than a reference threshold.

Example 14 includes the subject matter of any of Examples 1-13, and wherein to add the storage sub-commands to the storage sub-command queue comprises to add, based on the determined priority of the retrieved storage command, the storage sub-commands to the top of the storage sub-command queue as the next storage sub-commands to be executed.

Example 15 includes the subject matter of any of Examples 1-14, and wherein to add the storage sub-commands to the storage sub-command queue comprises to add, based on the determined priority of the retrieved storage command, the storage sub-commands to the storage sub-command queue as the next storage sub-commands to be executed.

Example 16 includes the subject matter of any of Examples 1-15, and wherein to add the storage sub-commands to the storage sub-command queue comprises to add, based on the determined priority of the retrieved storage command, the storage sub-commands to the storage sub-command queue above at least one other storage sub-command presently stored in the storage sub-command queue.

Example 17 includes the subject matter of any of Examples 1-16, and wherein to add the sub-commands to the storage sub-command queue comprises to add the storage sub-commands to the storage sub-command queue based on a priority of other storage sub-commands presently stored in the storage sub-command queue.

Example 18 includes the subject matter of any of Examples 1-17, and wherein to add the storage sub-commands to the storage sub-command queue based on the priority of other storage sub-commands presently stored in the storage sub-command queue comprises to compare the priority of the storage sub-commands to the priority of the other storage sub-commands presently stored in the storage sub-command queue.

Example 19 includes the subject matter of any of Examples 1-18, and wherein to add the storage sub-commands to the storage sub-command queue comprises to add, based on the determined priority of the retrieved storage command, the storage sub-commands to the bottom of the storage sub-command queue to be executed after each other storage sub-command presently stored in the storage sub-command queue.

Example 20 includes the subject matter of any of Examples 1-19, and further including a storage command executor to execute each storage sub-command stored in the storage sub-command queue in the order in which the storage sub-commands are stored in the storage sub-command queue.

Example 21 includes a method for prioritizing the execution of storage commands, the method comprising retrieving, by a controller of a data storage device, a storage command from a storage command queue of a host; determining, by the controller, a priority of the retrieved storage command; generating, by the controller and based on the retrieved storage command, one or more storage sub-commands to execute the retrieved storage command; and adding, by the controller, the sub-commands to a storage sub-command queue of the controller based on the determined priority of the retrieved storage command.

Example 22 includes the subject matter of Example 21, and wherein retrieving the storage command from the storage command queue of the host comprises retrieving the storage command from the storage command queue of the host in response to the ringing of a doorbell of the data storage device by the host.

Example 23 includes the subject matter of any of Examples 21 and 22, and wherein retrieving the storage command from the storage command queue of the host in response to the ringing of a doorbell of the data storage device by the host comprises retrieving the storage command from the storage command queue of the host in response to the host writing to a doorbell register of the data storage device.

Example 24 includes the subject matter of any of Examples 21-23, and wherein determining the priority of the retrieved storage command comprises determining a priority of the retrieved storage command based on a priority associated with the storage command queue of the host from which the storage command was retrieved.

Example 25 includes the subject matter of any of Examples 21-24, and wherein determining the priority of the retrieved storage command comprises determining a priority of the retrieved storage command based on metadata associated with the retrieved storage command.

Example 26 includes the subject matter of any of Examples 21-25, and wherein determining the priority of the retrieved storage command comprises determining a priority of the retrieved storage command based on a priority tag associated with the retrieved storage command.

Example 27 includes the subject matter of any of Examples 21-26, and wherein determining the priority of the retrieved storage command comprises determining a priority of the retrieved storage command based on a size of a storage access of the retrieved storage command.

Example 28 includes the subject matter of any of Examples 21-27, and wherein determining the priority of the retrieved storage command comprises determining a priority of the retrieved storage command based on a type of the retrieved storage command.

Example 29 includes the subject matter of any of Examples 21-28, and wherein determining the priority of the retrieved storage command based on the type of the retrieved storage command comprises determining that the storage command is of a high priority in response to a determination that the retrieved storage command is a read command.

Example 30 includes the subject matter of any of Examples 21-29, and wherein determining the priority of the retrieved storage command based on the type of the retrieved storage command comprises determining that the storage command is of a high priority in response to a determination that the retrieved storage command is a write command with a storage access size less than a reference threshold.

Example 31 includes the subject matter of any of Examples 21-30, and wherein determining the priority of the retrieved storage command comprises determining a priority of the retrieved storage command based on an application of the host that issued the storage command.

Example 32 includes the subject matter of any of Examples 21-31, and wherein determining the priority of the retrieved storage command comprises determining a priority of the retrieved storage command based on a processor core of the host that issued the storage command.

Example 33 includes the subject matter of any of Examples 21-32, and wherein generating the one or more storage sub-commands comprises determining, by the controller, a size of a storage access of the retrieved storage command; and generating, by the controller, one or more storage sub-commands based on the retrieved storage command in response to a determination that the size of the storage access is greater than a reference threshold.

Example 34 includes the subject matter of any of Examples 21-33, and wherein adding the storage sub-commands to the storage sub-command queue of the controller comprises adding, based on the determined priority of the retrieved storage command, the storage sub-commands to the top of the storage sub-command queue of the controller as the next storage sub-commands to be executed by the controller.

Example 35 includes the subject matter of any of Examples 21-34, and wherein adding the storage sub-commands to the storage sub-command queue of the controller comprises adding, based on the determined priority of the retrieved storage command, the storage sub-commands to the storage sub-command queue of the controller as the next storage sub-commands to be executed.

Example 36 includes the subject matter of any of Examples 21-35, and wherein adding the storage sub-commands to the storage sub-command queue of the controller comprises adding, based on the determined priority of the retrieved storage command, the storage sub-commands to the storage sub-command queue of the controller above at least one other storage sub-command presently stored in the storage sub-command queue of the controller.

Example 37 includes the subject matter of any of Examples 21-36, and wherein adding the sub-commands to the storage sub-command queue of the controller comprises adding the storage sub-commands to the storage sub-command queue of the controller based on a priority of other storage sub-commands presently stored in the storage sub-command queue.

Example 38 includes the subject matter of any of Examples 21-37, and wherein adding the storage sub-commands to the storage sub-command queue of the controller based on the priority of other storage sub-commands presently stored in the storage sub-command queue comprises comparing the priority of the storage sub-commands to the priority of the other storage sub-commands presently stored in the storage sub-command queue of the controller.

Example 39 includes the subject matter of any of Examples 21-38, and wherein adding the storage sub-commands to the storage sub-command queue of the controller comprises adding, based on the determined priority of the retrieved storage command, the storage sub-commands to the bottom of the storage sub-command queue of the controller to be executed after each other storage sub-command presently stored in the storage sub-command queue of the controller.

Example 40 includes the subject matter of any of Examples 21-39, and further including executing, by the controller, each storage sub-command stored in the storage sub-command queue in the order in which the storage sub-commands are stored in the storage sub-command queue.

Example 41 includes one or more machine-readable storage media comprising a plurality of instructions stored thereon that, when executed, causes controller of a data storage device to perform the method of any of Examples 21-40.

Example 42 includes a data storage device comprising means for retrieving a storage command from a storage command queue of a host; means for determining a priority of the retrieved storage command; means for generating, based on the retrieved storage command, one or more storage sub-commands to execute the retrieved storage command; and means for adding the sub-commands to a storage sub-command queue of the controller based on the determined priority of the retrieved storage command.

Example 43 includes the subject matter of Example 42, and wherein the means for retrieving the storage command from the storage command queue of the host comprises means for retrieving the storage command from the storage command queue of the host in response to the ringing of a doorbell of the data storage device by the host.

Example 44 includes the subject matter of any of Examples 42 and 43, and wherein the means for retrieving the storage command from the storage command queue of the host in response to the ringing of a doorbell of the data storage device by the host comprises means for retrieving the storage command from the storage command queue of the host in response to the host writing to a doorbell register of the data storage device.

Example 45 includes the subject matter of any of Examples 42-44, and wherein the means for determining the priority of the retrieved storage command comprises means for determining a priority of the retrieved storage command based on a priority associated with the storage command queue of the host from which the storage command was retrieved.

Example 46 includes the subject matter of any of Examples 42-45, and wherein the means for determining the priority of the retrieved storage command comprises means for determining a priority of the retrieved storage command based on metadata associated with the retrieved storage command.

Example 47 includes the subject matter of any of Examples 42-46, and wherein the means for determining the priority of the retrieved storage command comprises means for determining a priority of the retrieved storage command based on a priority tag associated with the retrieved storage command.

Example 48 includes the subject matter of any of Examples 42-47, and wherein the means for determining the priority of the retrieved storage command comprises means for determining a priority of the retrieved storage command based on a size of a storage access of the retrieved storage command.

Example 49 includes the subject matter of any of Examples 42-48, and wherein the means for determining the priority of the retrieved storage command comprises means for determining a priority of the retrieved storage command based on a type of the retrieved storage command.

Example 50 includes the subject matter of any of Examples 42-49, and wherein the means for determining the priority of the retrieved storage command based on the type of the retrieved storage command comprises means for determining that the storage command is of a high priority in response to a determination that the retrieved storage command is a read command.

Example 51 includes the subject matter of any of Examples 42-50, and wherein the means for determining the priority of the retrieved storage command based on the type of the retrieved storage command comprises means for determining that the storage command is of a high priority in response to a determination that the retrieved storage command is a write command with a storage access size less than a reference threshold.

Example 52 includes the subject matter of any of Examples 42-51, and wherein the means for determining the priority of the retrieved storage command comprises means for determining a priority of the retrieved storage command based on an application of the host that issued the storage command.

Example 53 includes the subject matter of any of Examples 42-52, and wherein the means for determining the priority of the retrieved storage command comprises means for determining a priority of the retrieved storage command based on a processor core of the host that issued the storage command.

Example 54 includes the subject matter of any of Examples 42-53, and wherein the means for generating the one or more storage sub-commands comprises means for determining a size of a storage access of the retrieved storage command; and means for generating one or more storage sub-commands based on the retrieved storage command in response to a determination that the size of the storage access is greater than a reference threshold.

Example 55 includes the subject matter of any of Examples 42-54, and wherein the means for adding the storage sub-commands to the storage sub-command queue of the controller comprises means for adding, based on the determined priority of the retrieved storage command, the storage sub-commands to the top of the storage sub-command queue of the controller as the next storage sub-commands to be executed by the controller.

Example 56 includes the subject matter of any of Examples 42-55, and wherein the means for adding the storage sub-commands to the storage sub-command queue of the controller comprises means for adding, based on the determined priority of the retrieved storage command, the storage sub-commands to the storage sub-command queue of the controller as the next storage sub-commands to be executed.

Example 57 includes the subject matter of any of Examples 42-56, and, wherein the means for adding the storage sub-commands to the storage sub-command queue of the controller comprises means for adding, based on the determined priority of the retrieved storage command, the storage sub-commands to the storage sub-command queue of the controller above at least one other storage sub-command presently stored in the storage sub-command queue of the controller.

Example 58 includes the subject matter of any of Examples 42-57, and wherein the means for adding the sub-commands to the storage sub-command queue of the controller comprises means for adding the storage sub-commands to the storage sub-command queue of the controller based on a priority of other storage sub-commands presently stored in the storage sub-command queue.

Example 59 includes the subject matter of any of Examples 42-58, and, wherein the means for adding the storage sub-commands to the storage sub-command queue of the controller based on the priority of other storage sub-commands presently stored in the storage sub-command queue comprises means for comparing the priority of the storage sub-commands to the priority of the other storage sub-commands presently stored in the storage sub-command queue of the controller.

Example 60 includes the subject matter of any of Examples 42-59, and wherein the means for adding the storage sub-commands to the storage sub-command queue of the controller comprises means for adding, based on the determined priority of the retrieved storage command, the storage sub-commands to the bottom of the storage sub-command queue of the controller to be executed after each other storage sub-command presently stored in the storage sub-command queue of the controller.

Example 61 includes the subject matter of any of Examples 42-60, and further including means for executing each storage sub-command stored in the storage sub-command queue in the order in which the storage sub-commands are stored in the storage sub-command queue.

The invention claimed is:

1. A data storage device for prioritized execution of storage commands, the data storage device comprising:
   a memory to store a storage sub-command queue; and
   a host storage command fetcher to retrieve a storage command from a storage command queue of a host;
   a storage command priority analyzer to determine a non-sequential priority of the retrieved storage command, wherein to determine the priority of the retrieved storage command comprises to determine a priority of the retrieved storage command based on at least one of: (i) metadata associated with the retrieved storage command, or (ii) a processor core of the host that issued the storage command;
   a storage command manager to generate, based on the retrieved storage command, one or more storage sub-commands that subdivide the retrieved storage command into a plurality of storage sub-commands to execute the retrieved storage command and add the sub-commands to the storage sub-command queue based on the determined priority of the retrieved storage command.

2. The data storage device of claim 1, wherein to retrieve the storage command from the storage command queue of the host comprises to retrieve the storage command from the storage command queue of the host in response to the ringing of a doorbell of the data storage device by the host.

3. The data storage device of claim 1, wherein to determine the priority of the retrieved storage command comprises to determine a priority of the retrieved storage command based on a priority associated with the storage command queue of the host from which the storage command was retrieved.

4. The data storage device of claim 1, wherein to determine the priority of the retrieved storage command comprises to determine a priority of the retrieved storage command based on a type of the retrieved storage command.

5. The data storage device of claim 4, wherein to determine the priority of the retrieved storage command based on the type of the retrieved storage command comprises to determine that the storage command is of a high priority in response to a determination that the retrieved storage command is a read command.

6. The data storage device of claim 4, wherein to determine the priority of the retrieved storage command based on the type of the retrieved storage command comprises to determine that the storage command is of a high priority in response to a determination that the retrieved storage command is a write command with a storage access size less than a reference threshold.

7. The data storage device of claim 1, wherein to generate the one or more storage sub-commands comprises to:
   determine a size of a storage access of the retrieved storage command; and
   generate one or more storage sub-commands based on the retrieved storage command in response to a determination that the size of the storage access is greater than a reference threshold.

8. The data storage device of claim 1, wherein to add the sub-commands to the storage sub-command queue comprises to add the storage sub-commands to the storage sub-command queue based on a priority of other storage sub-commands presently stored in the storage sub-command queue.

9. A method for prioritizing the execution of storage commands, the method comprising:
   retrieving, by a controller of a data storage device, a storage command from a storage command queue of a host;
   determining, by the controller, a non-sequential priority of the retrieved storage command, wherein determining the priority of the retrieved storage command comprises determining a priority of the retrieved storage command based on at least one of: (i) metadata associated with the retrieved storage command, or (ii) a processor core of the host that issued the storage command;
   generating, by the controller and based on the retrieved storage command, one or more storage sub-commands that subdivide the retrieved storage command into a plurality of storage sub-commands to execute the retrieved storage command; and
   adding, by the controller, the sub-commands to a storage sub-command queue of the controller based on the determined priority of the retrieved storage command.

10. The method of claim 9, wherein retrieving the storage command from the storage command queue of the host comprises retrieving the storage command from the storage command queue of the host in response to the ringing of a doorbell of the data storage device by the host.

11. The method of claim 9, wherein determining the priority of the retrieved storage command comprises determining a priority of the retrieved storage command based on a priority associated with the storage command queue of the host from which the storage command was retrieved.

12. The method of claim 9, wherein determining the priority of the retrieved storage command comprises determining a priority of the retrieved storage command based on a type of the retrieved storage command.

13. The method of claim 12, wherein determining the priority of the retrieved storage command based on the type of the retrieved storage command comprises determining that the storage command is of a high priority in response to a determination that the retrieved storage command is a read command.

14. The method of claim 12, wherein determining the priority of the retrieved storage command based on the type of the retrieved storage command comprises determining that the storage command is of a high priority in response to a determination that the retrieved storage command is a write command with a storage access size less than a reference threshold.

15. The method of claim 9, wherein generating the one or more storage sub-commands comprises:
   determining, by the controller, a size of a storage access of the retrieved storage command; and
   generating, by the controller, one or more storage sub-commands based on the retrieved storage command in response to a determination that the size of the storage access is greater than a reference threshold.

16. One or more machine-readable storage media comprising a plurality of instructions stored thereon that, when executed, causes controller of a data storage device to:
   retrieve a storage command from a storage command queue of a host;
   determine a non-sequential priority of the retrieved storage command, wherein to determine the priority of the retrieved storage command comprises to determine a priority of the retrieved storage command based on at least one of: (i) metadata associated with the retrieved storage command, or (ii) a processor core of the host that issued the storage command;
   generate, based on the retrieved storage command, one or more storage sub-commands that subdivide the retrieved storage command into a plurality of storage sub-commands to execute the retrieved storage command; and
   add the sub-commands to a storage sub-command queue of the controller based on the determined priority of the retrieved storage command.

17. The one or more machine-readable storage media of claim 16, wherein to retrieve the storage command from the storage command queue of the host comprises to retrieve the storage command from the storage command queue of the host in response to the ringing of a doorbell of the data storage device by the host.

18. The one or more machine-readable storage media of claim 16, wherein to determine the priority of the retrieved storage command comprises to determine a priority of the retrieved storage command based on a priority associated with the storage command queue of the host from which the storage command was retrieved.

19. The one or more machine-readable storage media of claim 18, wherein to determine the priority of the retrieved storage command comprises to determine a priority of the retrieved storage command based on a type of the retrieved storage command.

20. The one or more machine-readable storage media of claim 18, wherein to determine the priority of the retrieved storage command based on the type of the retrieved storage command comprises to determine that the storage command is of a high priority in response to a determination that the retrieved storage command is a read command.

21. The one or more machine-readable storage media of claim 18, wherein to determine the priority of the retrieved storage command based on the type of the retrieved storage command comprises to determine that the storage command is of a high priority in response to a determination that the retrieved storage command is a write command with a storage access size less than a reference threshold.

22. The one or more machine-readable storage media of claim 16, wherein to generate the one or more storage sub-commands comprises to:
   determine a size of a storage access of the retrieved storage command; and
   generate one or more storage sub-commands based on the retrieved storage command in response to a determination that the size of the storage access is greater than a reference threshold.

* * * * *